United States Patent Office
3,213,087
Patented Oct. 19, 1965

3,213,087
19-NOR-RETROPREGNANE DERIVATIVES
Albert Bowers, John Edwards, and Pierre Crabbé, Mexico City, Mexico, assignors to Syntex Corporation, Panama, Panama, a corporation of Panama
No Drawing. Filed Nov. 9, 1962, Ser. No. 236,739
20 Claims. (Cl. 260—239.55)

The present invention relates to certain new cyclopentanophenanthrene derivatives.

More particularly the present invention relates to novel compounds of the 19-nor-pregnane series with abnormal configuration at the centers of asymmetry of the steroid skeleton, particularly at carbon atoms 9 and 10.

The transformation of the normal steroid configuration of the 19-nor steroids into the $9\beta,10\alpha$-configuration has been found to have a remarkable effect on the physiological properties of the compounds, in comparison with those of the normal $9\alpha,10\beta$-series. Thus, the compounds object of the present invention are potent progestational agents with high oral activity, useful in the treatment of amenorrhea, dysmenorrhea, premenstrual tension and fertility control.

The novel compounds of the present invention are represented by the following formulas:

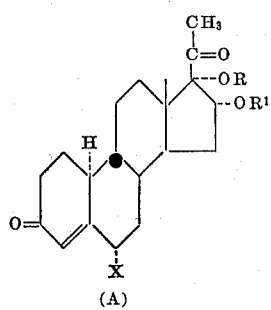

(A)

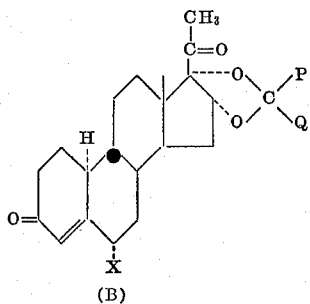

(B)

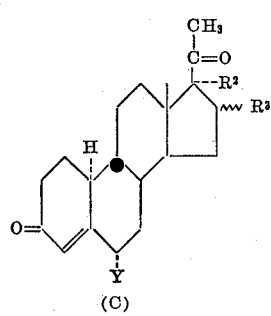

(C)

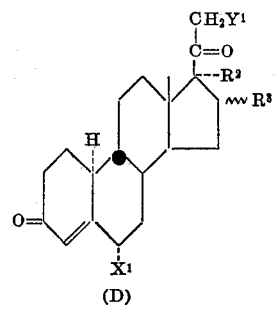

(D)

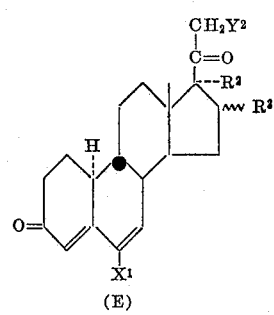

(E)

In the above formulas R and $R^1$ each represent hydrogen or a hydrocarbon carboxylic acid group of less than 12 carbon atoms; P represents a lower alkyl and Q represents hydrogen, lower alkyl, aryl or aralkyl group, each containing up to 8 carbon atoms; $R^2$ represents hyrdogen, $\alpha$-hydroxy or $\alpha$-acyloxy; $R^3$ represents hydrogen, $\alpha$-methyl, $\beta$-methyl, $\alpha$-hydroxy, $\alpha$-acyloxy; in addition $R^2$ and $R^3$ together may represent the group

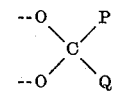

wherein P and Q have the meaning hereinbefore indicated; X represents hydrogen or $\alpha$-methyl; Y and $Y^1$ represent fluorine or chlorine; $X^1$ represents hydrogen, methyl, chlorine or fluorine and $Y^2$ represents hydrogen, fluorine or chlorine.

The acyl and acyloxy groups above referred to are derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate and $\beta$-chloropropionate.

The compounds represented by A and B are obtained by the process illustrated by the following equation:

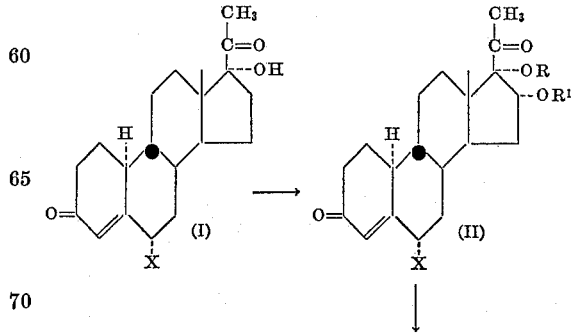

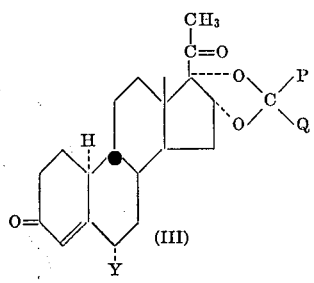

In the above formulas, R, R¹, X, P and Q have the same meaning as heretofore set forth.

In practicing the process just outlined, the starting materials, Δ⁴-19-nor-9β,10α-pregnene-17α-ol-3,20-dione or the 6α-methyl derivative (I) described in our copending patent application Serial No. 210,211 filed July 16, 1962, are subjected to microbiological oxidation with the microorganism *Streptomyces roseochromogenus*, to thus form the corresponding 16α-hydroxy derivatives, namely Δ⁴-19-nor-9β,10α-pregnene-16α,17α-diol-3,20-dione and 6α-methyl-Δ⁴-19-nor-9β,10α-pregnene-16α,17α-diol-3,20-dione (II, R and R¹=H). Conventional esterification of these compounds with hydrocarbon carboxylic acid anhydrides of less than 12 carbon atoms in pyridine solution produces the 16-monoesters (II: R=H; R¹=acyl); esterification under more drastic conditions, i.e. in benzene solution and in the presence of p-toluenesulfonic acid afford the 16α,17α-diesters (II: R and R¹=acyl).

By reaction of the 16α,17α-dihydroxy compounds (II: R and R¹=H) with a ketone or aldehyde such as acetone, formaldehyde, acetaldehyde, butanone, acetophenone and the like, in the presence of catalytic amounts of perchloric acid, there are produced the corresponding 16α,17α-cyclic ketals or 16α,17α-cyclic acetals (III).

The 6α-fluoro and 6α-chloro-Δ⁴-19-nor-9β,10α-pregnen derivatives (C) are obtained by the following sequence of reactions:

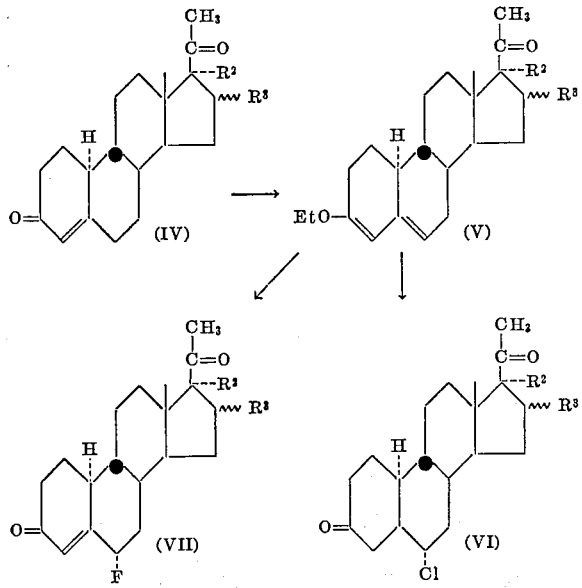

In the above formulas, R² and R³ have the meaning indicated heretofore.

In practicing the process outlined above, the starting material, i.e. Δ⁴-19-nor-9β,10α-pregnene-3,20-dione; Δ⁴-19-nor-9β,10α-pregnen-17α-ol-3,20-dione, as well as the 16-substituted derivatives thereof (IV) are treated with ethyl orthoformate in dioxane solution and in the presence of p-toluenesulfonic acid, to produce the corresponding 3-enol ethers (V). By reaction of these compounds with approximately 1 molar equivalent of N-chlorosuccinimide in acetone solution and in the presence of sodium acetate, there are obtained the 6β-chloro intermediates, which upon acid treatment, preferably by reaction with anhydrous hydrogen chloride in acetic acid solution, at low temperature are isomerized to the 6α-chloro compounds (VI).

When the 3-enol ethers (V) are reacted with perchloryl fluoride in dimethyl formamide solution, at low temperature, preferably at about 0° C., there are produced the 6β-fluoro-Δ⁴-3-keto compounds which upon isomeration with hydrogen chloride in acetic acid afford the 6α-fluoro derivatives (VII).

Among the compounds obtained by this method are 6α-chloro-Δ⁴-19-nor-9β,10α-pregnene-3,20-dione, 6α-chloro-Δ⁴-19-nor-9β,10α-pregnen-17α-ol-3,20-dione; 6α-chloro-16α-methyl-Δ⁴-19-nor-9β,10α-pregnene-3,20-dione; 6α-chloro-16β-methyl-Δ⁴-19-nor-9β,10α-pregnene-3,20-dione; 6α-chloro-16α-methyl-Δ⁴-19-nor-9β,10α-pregnen-17α-ol-3,20-dione; 6α-chloro-16α,17α-isopropylidenedioxy-Δ⁴-19-nor-9β,10α-pregnene-3,20-dione and the corresponding 6α-fluoro compounds.

The 6α-fluoro and 6α-chloro-17α-hydroxy compounds may be esterified by conventional methods, such as for example, by reaction with acid anhydrides in benzene solution and in the presence of p-toluenesulfonic acid.

The 21-halo and 6-dehydro compounds of the present invention (D and E) are obtained by the process illustrated by the following equation:

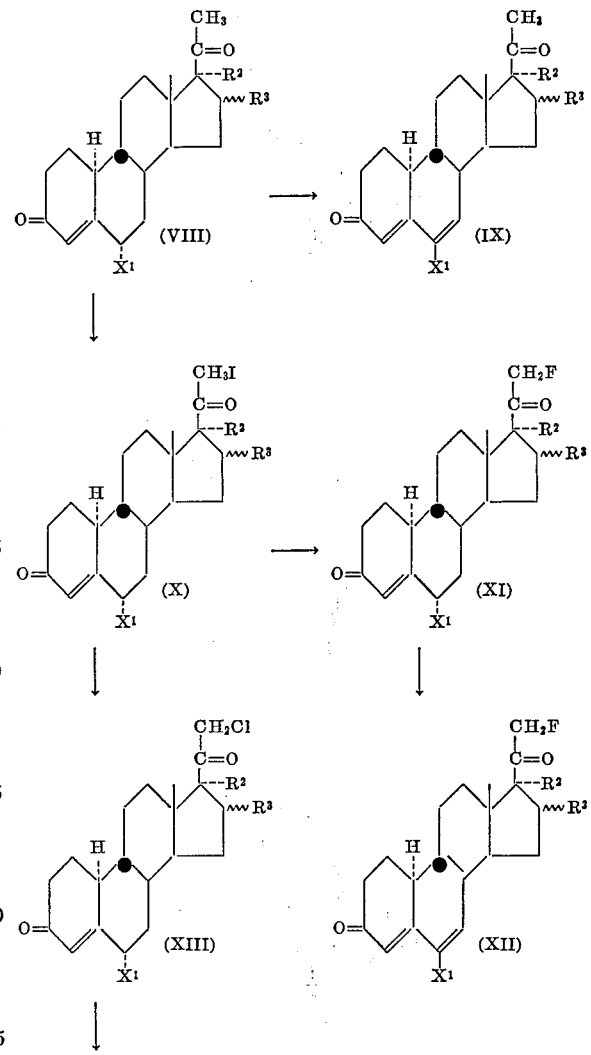

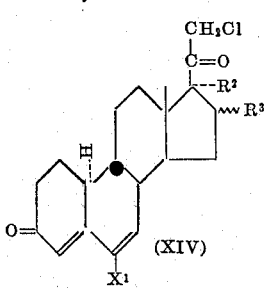

In the above formulas, $R^2$, $R^3$ and $X^1$ have the same meaning heretofore indicated.

In practicing the process outlined above, the starting materials, $\Delta^4$-19-nor-9β,10α-pregnene-3,20-dione, $\Delta^4$-19-nor-9β,10α-pregnen-17α-ol-3,20-dione, the 6-methyl, 6-fluoro and 6-chloro derivatives, as well as the 16-substituted derivatives of such compounds (VIII) are treated with a dehydrogenating agent, preferably with a quinone having an oxidation-reduction potential of less than −0.5, such as benzoquinone, chloranil (tetrachlorobenzoquinone), 2,6-dichlorobenzoquinone and the like to introduce a double bond between C-6 and C-7 (IX). The reaction is effected in organic solvents such as t-butyl alcohol, t-amyl alcohol, xylene, toluene and the like. There are thus produced among others, $\Delta^{4,6}$-19-nor-9β, 10α - pregnadiene - 3,20 - dione, $\Delta^{4,6}$ - 19 - nor - 9β,10α-pregnadien - 17α - ol - 3,20 - dione, 6 - chloro - $\Delta^{4,6}$ - 19-nor - 9β,10α - pregnadiene - 3,20 - dione, 6 - fluoro - $\Delta^{4,6}$-19 - nor - 9β,10α - pregnadien - 17α - ol - 3,20 - dione, 6 - methyl - $\Delta^{4,6}$-19 - nor - 9β,10α - pregnadien - 17α - ol-3,20 - dione, 6 - chloro - 16α - methyl - $\Delta^{4,6}$ - 19 - nor-9β,10α - pregnadiene - 3,20 - dione, 6 fluoro-16α-methyl-$\Delta^{4,6}$ - 19 - nor - 9β,10α - pregnadien - 17α - ol - 3,20-dione, 6,16α - dimethyl - $\Delta^{4,6}$ - 19 - nor - 9β,10α - pregnadien - 17α - ol - 3,20 - dione, 6 - fluoro - 16α,17α - isopropylidenedioxy - $\Delta^{4,6}$ - 19 - 9β,10α - pregnadiene 3,20-dione, etc.

The 21-chloro and 21-fluoro compounds of the present invention are obtained from the same starting materials (VIII), which by reaction with iodine and calcium oxide, in a mixture of methanol-tetrahydrofuran produce the 21-iodo intermediates (X). Treatment of these compounds with silver fluoride in aqueous acetonitrile, at room temperature for a period of time in the order of 20 to 24 hours, produce the 21-fluoro-$\Delta^4$-19-nor-9β,10α-pregnenes (XI) which upon reaction with a quinone of the type previously mentioned, preferably using chloranil, afford the corresponding 21 - fluoro-$\Delta^{4,6}$-19-nor-9β,10α-pregnadienes (XII).

By heating the 21-iodo intermediate (X) with lithium chloride in dimethylformamide solution, at approximately 100° C. for a period of time of 6 to 10 hours, the iodine is substituted by chlorine, thus producing the 21-chloro-$\Delta^4$-19-nor-9β,10α pregnenes (XIII). Dehydrogenation of these compounds with chloranil give rise to the corresponding 21-chloro-$\Delta^{4,6}$-19-nor - 9β,10α - pregnadienes (XIV).

Alternatively, the 21-fluoro pregnenes may be obtained by reaction of the 21-iodo compounds (X) with potassium fluoride in dimethylformamide solution.

The following examples serve to illustrate but are not intended to limit the scope of the present invention:

Example I

A culture of *Streptomyces roseochromogenus* ATCC 3347 was prepared in an inclined agar medium containing 1% of glucose and 1% of yeast extract. 1 cc. of a suspension of this culture was then used to inoculate each one of a series of 250 cc. flasks containing 50 cc. of a sterilized aqueous medium of 2% peptone and 5% corn syrup; the mixtures were then incubated in a shaking machine at 28° C. under aeration for a period of 24–48 hours. There was thus obtained a vegetating growing culture of *Streptomyces roseochromogenus* which was used for the subsequent incubation of the steroid.

10 mg. of $\Delta^4$-19-nor-9β,10α-pregnen-17α-ol-3,20-dione, were added to each 50 cc. of the vegetating culture of *Streptomyces roseochromogenus*, obtained as described above. The mixture was stirred for 48–72 hours with aeration and then extracted several times with methylene dichloride. The extract was washed with water, dried over anhydrous sodium sulfate, filtered and evaporated under reduced pressure.

The residue was purified by chromatography on silica gel thus giving $\Delta^4$-19-nor-9β,10α-pregnene-16α,17α-diol-3,20-dione (16α,17α-dihydroxy-19-nor - 9β,10α - progesterone).

In the same manner, $\Delta^4$-19-nor-9β,10α-pregnene-3,20-dione and 6α-methyl-$\Delta^4$-19-nor-9β,10α-pregnene-3,20-dione were converted into the corresponding 16α-hydroxylated derivatives.

Example II

To a solution of 1 g. of $\Delta^4$-19-nor-9β,10α-pregnene-16α,17α-diol-3,20-dione in 100 cc. of acetone there was added 30 drops of 72% perchloric acid. After 1 hour at room temperature 30 drops of pyridine were added and the resulting solution was evaporated to dryness under reduced pressure. 30 cc. of water were added to the residue and it was then extracted several times with 80 cc. of ethyl acetate. The combined extracts were washed to neutrality with water, dried over sodium sulfate and evaporated to dryness. The residue upon trituration with methanol gave 16α,17α-isopropylidenedioxy-19-nor-9β,10α-progesterone.

Example III

A mixture of 1 g. of $\Delta^4$-19-nor-9β,10α-pregnene-16α,17α-diol-3,20-dione, 50 cc. of freshly distilled acetophenone and 0.5 cc. of 72% perchloric acid was stirred at room temperature for 1 hour. The resulting mixture was washed with sodium bicarbonate solution and with water to neutrality, then it was steam distilled and the product extracted with methylene chloride. The extract was dried over anhydrous sodium sulfate and evaporated to dryness. Crystallization from acetone-hexane yielded the 16,17 acetophenonide of $\Delta^4$-19-nor-9β,10α-pregnene-16α,17α-diol-3,20-dione.

Example IV

Examples I and II were repeated but using 6α-methyl-$\Delta^4$-19-nor-9β,10α-pregnen-17α-ol - 3,20 - dione as starting material, thus affording 6α-methyl-$\Delta^4$ - 19 - nor - 9β,10α-pregnene-16α,17α-diol-3,20-dione and 16α,17α-isopropylidenedioxy - 6α - methyl-$\Delta^4$-19-nor-9β,10α-pregnene-3,20-dione.

Example V

A mixture of 1 g. of $\Delta^4$-19-nor-9β,10α-pregnene-16α, 17α-diol-3,20-dione, 4 cc. of pyridine and 2 cc. of acetic anhydride was kept at room temperature overnight, poured into ice water, the formed precipitate was filtered, washed with water and dried. Crystallization from acetone-hexane gave the 16-monoacetate of $\Delta^4$-19-nor-9β, 10α-pregnene-16α,17α-diol-3,20-dione.

By the same method 6α-methyl-$\Delta^4$-19-nor-9β,10α-pregnen-16α-ol-3,20-dione was converted into its acetate.

Example VI

To a solution of 1 g. of $\Delta^4$-19-nor-9β,10α-pregnene-16α,17α-diol-3,20-dione in 20 cc. of anhydrous benzene there were added 200 mg. of p-toluenesulfonic acid and 4 cc. of acetic anhydride and the mixture was kept at room temperature during 24 hours. It was poured over ice water and stirred for 30 minutes to hydrolyze the excess of anhydride. The benzene layer was separated, washed with 5% sodium carbonate solution and with water to neutral, dried over anhydrous sodium sulfate and evaporated to dryness. The residue was crystallized from acetone-ether to produce the 16, 17 diacetate of $\Delta^4$-19-nor-9$\beta$,10$\alpha$-pregnene-16$\alpha$,17$\alpha$-diol-3,20-dione.

In a similar manner, but using propionic, caproic and cyclopenthylpropionic anhydrides as esterifying agents there were produced the corresponding diesters of $\Delta^4$-19-nor-9$\beta$,10$\alpha$-pregnene-16$\alpha$,17$\alpha$-diol-3,20-dione.

*Example VII*

A solution of 500 mg. of 6$\alpha$-methyl-$\Delta^4$-19-nor-9$\beta$,10$\alpha$-pregnene-16$\alpha$,17$\alpha$-diol-3,20-dione, in 20 cc. of chloroform was treated with 1 g. of acetaldehyde and 2 drops of 3N perchloric acid and stirred at room temperature for 2 hours. After diluting with water the chloroform layer was separated, washed with aqueous saturated sodium bicarbonate solution and then with water, the chloroform was distilled and the residue was purified by chromatography on neutral alumina, thus yielding the 16,17-acetaldehyde-acetal of 6$\alpha$-methyl-$\Delta^4$-19-nor-9$\beta$,10$\alpha$-pregnene-16$\alpha$,17$\alpha$-diol-3,20-dione.

*Example VIII*

A suspension of 5 g. of $\Delta^4$-19-nor-9$\beta$,10$\alpha$-pregnen-17$\alpha$-ol-3,20-dione, in 37.5 cc. of anhydrous peroxide-free dioxane was treated with 6 cc. of freshly distilled ethyl orthoformate and 4.0 g. of p-toluenesulfonic acid. The mixture was stirred at room temperature for 15 minutes and the resulting solution let stand for 30 minutes further. 4 cc. of pyridine were added and then water. The formed precipitate was collected by filtration, water washed and air dried. Recrystallization from acetone-hexane afforded 3-ethoxy-$\Delta^{3,5}$-19-nor-9$\beta$,10$\alpha$-pregnadien-17$\alpha$-ol-20-one.

A mixture of 5 g. of the foregoing compound, 2 g. of anhydrous sodium acetate and 100 cc. of acetone was treated with 32 cc. of water and the solution was cooled to a temperature between 0 and 5° C. There was then added 1.1 molar equivalents of N-chloro-succinimide and 2 cc. of glacial acetic acid and the mixture was stirred between 0 and 5° C. for 30 minutes. It was then diluted with water, kept overnight at 0° C. and the precipitate formed was collected, washed with water, dried under vacuum and recrystallized from acetone thus giving 6$\beta$-chloro-$\Delta^4$-19-nor-9$\beta$,10$\alpha$-pregnen-17$\alpha$-ol-3,20-dione.

Into a solution of 3 g. of the preceding 6$\beta$-chloro-compound in 150 cc. of glacial acetic acid was passed a slow stream of dry hydrochloric acid for 4 hours, while maintaining the temperature around 15° C. The mixture was then poured into ice-water, the precipitate collected, washed with water, dried and recrystallized from acetone-hexane to give 6$\alpha$-chloro-$\Delta^4$-19-nor-9$\beta$,10$\alpha$-pregnen-17$\alpha$-ol-3, 20-dione.

In a similar manner, the following compounds (I) were converted into the corresponding 6$\alpha$-chloro-derivatives (II) via the 3-enol ether intermediates.

| I | II |
|---|---|
| $\Delta^4$-19-nor-9$\beta$,10$\alpha$-pregnene-3,20-dione. | 6$\alpha$-chloro-$\Delta^4$-19-nor-9$\beta$,10$\alpha$-pregnene-3,20-dione. |
| 16$\alpha$-methyl-$\Delta^4$-19-nor-9$\beta$,10$\alpha$-pregnene-3,20-dione. | 6$\alpha$-chloro-16$\alpha$-methyl-$\Delta^4$-19-nor-9$\beta$,10$\alpha$-pregnene-3,20-dione. |
| 16$\beta$-methyl-$\Delta^4$-19-nor-9$\beta$,10$\alpha$-pregnene-3,20-dione. | 6$\alpha$-chloro-16$\beta$-methyl-$\Delta^4$-19-nor-9$\beta$,10$\alpha$-pregnene-3,20-dione. |
| 16$\alpha$,17$\alpha$-isopropylidenedioxy-$\Delta^4$-19-nor-9$\beta$,10$\alpha$-pregnene-3,20-dione. | 6$\alpha$-chloro-16$\alpha$,17$\alpha$-isopropylidenedioxy-$\Delta^4$-19-nor-9$\beta$,10$\alpha$-pregnene-3,20-dione. |
| $\Delta^4$-19-nor-9$\beta$,10$\alpha$-pregnene-16$\alpha$,17$\alpha$-diol-3,20-dione-16,17-diacetate. | 6$\alpha$-chloro-$\Delta^4$-19-nor-9$\beta$,10$\alpha$-pregnene-16$\alpha$,17$\alpha$-diol-3,20-dione-16,17-diacetate. |
| 16$\alpha$-methyl-$\Delta^4$-19-nor-9$\beta$,10$\alpha$-pregnen-17$\alpha$-ol-3,20-dione. | 6$\alpha$-chloro-16$\alpha$-methyl-$\Delta^4$-19-nor-9$\beta$,10$\alpha$-pregnen-17$\alpha$-ol-3,20-dione. |

*Example IX*

A solution of 1 g. of $\Delta^4$-19-nor-9$\beta$,10$\alpha$-pregnene-17$\alpha$-ol-3,20-dione in 25 cc. of dimethylformamide was cooled to 0° C. and a stream of perchloryl fluoride was passed for 5 minutes; the solution was allowed to come slowly to 20° C.; it was then poured into water and extracted with ethyl acetate. The extract was washed with saturated aqueous solution of sodium bicarbonate, then with water to neutrality, dried over anhydrous sodium sulfate, and evaporated to dryness. The residue was dissolved in 50 cc. of glacial acetic acid and a stream of dry hydrochloric acid passed for a period of 24 hours, while maintaining the temperature around 15° C. The mixture was poured into cold water, the precipitate formed was separated, washed with water, dried and crystallized from acetone-hexane to yield 6$\alpha$ - fluoro - $\Delta^4$ - 19 - nor - 9$\beta$,10$\alpha$-pregnen-17$\alpha$-ol-3, 20-dione.

*Example X*

By following the method described in the preceding example, the 3 enol ether intermediates of Example VIII were treated with perchloryl fluoride in dimethylformamide solution, followed by acid treatment, to produce the corresponding 6$\alpha$-fluoro-compounds:
6$\alpha$-fluoro-$\Delta^4$-19-nor-9$\beta$,10$\alpha$-pregnene-3,20-dione.
6$\alpha$ - fluoro - 16$\alpha$ - methyl - $\Delta^4$ - 19 - nor - 9$\beta$,10$\alpha$ - pregnene-3,20-dione.
6$\alpha$ - fluoro - 16$\beta$ - methyl - $\Delta^4$ - 19 - nor - 9$\beta$, 10$\alpha$ - pregnene,3-20-dione.
6$\alpha$ - fluoro - 16$\alpha$, 17$\alpha$ - isopropylidenedioxy - $\Delta^4$ - 19 - nor-9$\beta$,10$\alpha$-pregnene, 3,20-dione.
6$\alpha$ - fluoro - $\Delta^4$ - 19 - nor - 9$\beta$,10$\alpha$ - pregnene - 16$\alpha$,17$\alpha$ - diol-3,20-dione-16,17-diacetate.
6$\alpha$ - fluoro - 16$\alpha$ - methyl - $\Delta^4$ - 19 - nor - 9$\beta$,10$\alpha$ - pregnen-17-$\alpha$-ol-3,20-dione.

*Example XI*

By following the esterification method of Example VI, 6$\alpha$ - chloro - $\Delta^4$ - 19 - nor - 9$\beta$,10$\alpha$ - pregnen - 17$\alpha$ - ol - 3,20-dione and 6$\alpha$-fluoro-$\Delta^4$-19-nor-9$\beta$,10$\alpha$-pregnen-17$\alpha$-ol-3,20-dione were converted into the corresponding acetates.

*Example XII*

A cooled solution of 4 g. of $\Delta^4$-19-nor-9$\beta$,10$\alpha$-pregnen-17$\alpha$-ol-3,20-dione in 30 cc. of tetrahydrofuran and 18 cc. of methanol was treated under continuous stirring with 6 g. of pure calcium oxide, in small portions, and then with 6 g. of iodine. The stirring was continued at room temperature until the solution turned pale yellow. The mixture was poured into ice water containing 18 cc. of acetic acid and 2 g. of sodium thiosulfate. After stirring for 15 minutes the solution was decanted and the precipitate was collected by filtration, thus giving 21-iodo-$\Delta^4$-19-nor-9$\beta$,10$\alpha$-pregnen-17$\alpha$-ol-3,20-dione.

The crude product was dried in vacuum, dissolved in 20 cc. of acetonitrile and treated dropwise with 1.4 g. of silver fluoride dissolved in 3 cc. of water. After a short time, silver iodide started to separate leaving the 21-fluoro-pregnan derivative in solution. The mixture was kept for 24 hours at room temperature and filtered. Concentration of the filtrate under vacuum gave a crude product which after crystallization from methanol-acetone yielded 21-fluoro-$\Delta^4$-19-nor-9$\beta$,10$\alpha$-pregnen-17$\alpha$-ol-3,20-dione.

In a similar manner, the compounds listed below under I were converted into the corresponding 21-fluoro derivatives (II) via the 21-iodo intermediates.

| I | II |
|---|---|
| 6α-chloro-Δ⁴-19-nor-9β,10α-pregnen-17α-ol-3,20-dione. | 21-fluoro-6α-chloro-Δ⁴-19-nor-9β,10α-pregnen-17α-ol-3,20-dione. |
| 16α-methyl-6α-chloro-Δ⁴-19-nor-9β,10α-pregnene-3,20-dione. | 21-fluoro-16α-methyl-6α-chloro-Δ⁴-19-nor-9β,10α-pregnene-3,20-dione. |
| 16α,17α-isopropylidenedioxy-Δ⁴-19-nor-9β,10α-pregnene-3,20-dione. | 21-fluoro-16α,17α-isopropylidenedioxy-Δ⁴-19-nor-9β,10α-pregnene-3,20-dione. |
| 16α-methyl-Δ⁴-19-nor-9β,10α-pregnen-17α-ol-3,20-dione. | 21-fluoro-16α-methyl-Δ⁴-19-nor-9β,10α-pregnen-17α-ol-3,20-dione. |
| 16α,17α-acetaldehyde acetal of 6α-methyl-Δ⁴-19-nor-9β-10α-pregnene-16α,17α-diol-3,20-dione. | 21-fluoro-16α,17α-acetaldehyde acetal of 6α-methyl-Δ⁴-19-nor-9β,10α-pregnene-16α,17α-diol-3,20-dione. |
| Δ⁴-19-nor-9β,10α-pregnene-16α,17α-diol-3,20-dione-16,17-diacetate. | 21-fluoro-Δ⁴-19-nor-9β,10α-pregnene-16α,17α-diol-3,20-dione-16,17-diacetate. |
| 6α-chloro-16β-methyl-Δ⁴-19-nor-9β,10α-pregnene-3,20-dione. | 21-fluoro-6α-chloro-16β-methyl-Δ⁴-19-nor-9β,10α-pregnene-3,20-dione. |
| Δ⁴-19-nor-9β,10α-pregnene-3,20-dione. | 21-fluoro-9β,10α-pregnene-3,20-dione. |
| 6α-fluoro-Δ⁴-19-nor-9β,10α-pregnen-17α-ol-3,20-dione. | 6α,21-difluoro-Δ⁴-19-nor-9β,10α-pregnen-17α-ol-3,20-dione. |
| 6α-fluoro-16α-methyl-Δ⁴-19-nor-9β,10α-pregnen-17α-ol-3,20-dione. | 6α,21-difluoro-16α-methyl-Δ⁴-19-nor-9β,10α-pregnen-17α-ol-3,20-dione. |
| 6α-fluoro-Δ⁴-19-nor-9β,10α-pregnene-3,20-dione. | 6α,21-difluoro-Δ⁴-19-nor-9β,10α-pregnene-3,20-dione. |
| 6α,16α-dimethyl-19-nor-9β,10α-pregnen-17α-ol-3,20-dione. | 21-fluoro-6α,16α-dimethyl-19-nor-9β,10α-pregnen-17α-ol-3,20-dione. |
| 6α-methyl-19-nor-9β,10α-pregnen-17α-ol-3,20-dione. | 21-fluoro-6α-methyl-19-nor-9β,10α-pregnen-17α-ol-3,20-dione. |

*Example XIII*

To a solution of 1 g. of 21-iodoΔ⁴-19-nor-9β,10α-pregnen-17α-ol-3,20-dione in 20 cc. of anhydrous dimethylformamide there was added 1 g. of lithium chloride and the mixture heated at 100° C. for 8 hours. It was then poured into water, extracted with ether, the organic extract washed with water, dried and evaporated to dryness. Chromatography of the residue gave the pure 21-chloro-Δ⁴-19-nor-9β,10α-pregnen-17α-ol-3,20-dione.

In a similar manner the 21-iodo intermediates of the preceding example were converted into the corresponding 21-chloro compounds:

6α,21-dichloro-Δ⁴-19-nor-9β,10α-pregnen-17α-ol-3,20-dione
16α-methyl-6α,21-dichloro-Δ⁴-19-nor-9β,10α-pregnene-3,20-dione
21-chloro-16α,17α-isopropylidenedioxy-Δ⁴-19-nor-9β,10α-pregnene-3,20-dione
21-chloro-16α-methyl-Δ⁴-19-nor-9β,10α-pregnen-17α-ol-3,20-dione
16α,17α-acetaldehyde acetal of 21-chloro-6α-methyl-Δ⁴-19-nor-9β,10α-pregnene-16α,17α-diol-3,20-dione
21-chloro-Δ⁴-19-nor-9β,10α-pregnene-16α,17α-diol-3,20-dione16,17diacetate
6α,21-dichloro-16β-methyl-Δ⁴-19-nor-9β,10α-pregnene-3,20-dione
21-chloro-9β,10α-pregnene-3,20-dione
6α-fluoro-21-chloro-Δ⁴-19-nor-9β,10α-pregnen-17α-ol-3,20-dione
6α-fluoro-21-chloro-16α-methyl-Δ⁴-19-nor-9β,10α-pregnen-17α-ol-3,20-dione
6α-fluoro-21-chloro-Δ⁴-19-nor-9β,10α-pregnene-3,20-dione
21-chloro-6α,16α-dimethyl-19-nor-9β,10α-pregnen-17α-ol-3,20-dione
21-chloro-6α-methyl-19-nor-9β,10α-pregnen-17α-ol-3,20-dione

*Example XIV*

The preceding example was repeated but using potassium fluoride instead of lithium chloride, thus affording 21 - fluoro - Δ⁴ - 19-nor-9β,10α-pregnen-17α-ol-3,20-dione, identical to that obtained by the method of Example XII.

500 mg. of the foregoing compound were esterified with caproic anhydride in benzene solution and in the presence of p-toluenesulfonic acid, by following the method of Example VI, to produce the caproate of 21-fluoro-Δ⁴-19-nor-9β,10α-pregnen-17α-ol-3,20-dione.

*Example XV*

A mixture of 1 g. of Δ⁴-19-nor-9β,10α-pregnen-17α-ol-3,20-dione, 2 g. of chloranil and 50 cc. of terbutanol was refluxed for 8 hours. The mixture was cooled, the excess of chloranil filtered off and washed with ethyl acetate and the organic extracts washed with a cold aqueous solution of 10% sodium hydroxide until the washings were colorless. It was then dried over anhydrous sodium sulfate and evaporated to dryness. Recrystallization from methylene chloride-ether, after decolorization with alumina gave Δ⁴,⁶-19-nor-9β,10α-pregnadien-17α-ol-3,20-done.

*Example XVI*

A mixture of 5 g. of 16α,17α-isopropylidenedioxy-19-nor-9β,10α-progesterone, 8 g. of chloranil and 200 cc. of xylene was refluxed for 12 hours, cooled and diluted with ether. The solution was washed with water, 5% sodium hydroxide solution and again with water to neutral, dried over anhydrous sodium sulfate and evaporated to dryness under reduced pressure. By chromatography of the residue on neutral alumina there was obtained 16α,17α-isopropylidenedioxy - Δ⁴,⁶ - 19-nor-9β,10α-pregnadiene-3,20-dione.

*Example XVII*

In accordance with the method of Example XV, there were prepared the following compounds:

16α-methyl-Δ⁴,⁶-19-nor-9β,10α-pregnadiene-3,20-dione
16α-methyl-Δ⁴,⁶-19-nor-9β,10α-pregnadien-17α-ol-3,20-dione
6-chloro-Δ⁴,⁶-19-nor-9β,10α-pregnadiene-3,20-dione
6-chloro-16β-methyl-Δ⁴,⁶-19-nor-9β,10α-pregnadiene-3,20-dione
6-chloro-16α,17α-isopropylidenedioxy-Δ⁴,⁶-19-nor-9β,10α-pregnadiene-3,20-dione
6-fluoro-Δ⁴,⁶-19-nor-9β,10α-pregnadiene-3,20-dione
6-fluoro-16α-methyl-Δ⁴,⁶-19-nor-9β,10α-pregnadiene-3,20-dione
6-fluoro-16α-methyl-Δ⁴,⁶-19-nor-9β,10α-pregnadien-17α-ol-3,20-dione
6-methyl-Δ⁴,⁶-19-nor-9β-10α-pregnadiene-3,20-dione
6-methyl-Δ⁴,⁶-19-nor-9β,10α-pregnadiene-17α-ol-3,20-dione
6,16α-dimethyl-Δ⁴,⁶-19-nor-9β,10α-pregnadiene-17α-ol-3,20-dione
21-fluoro-6-chloro-Δ⁴,⁶-19-nor-9β,10α-pregnadiene-17α-ol-3,20-dione
21-fluoro-16α-methyl-6-chloro-Δ⁴,⁶-nor-9β,10α-pregnadiene-3,20-dione
21-fluoro-16α,17α-isopropylidenedioxy-Δ⁴,⁶-19-nor-9β,10α-pregnadiene-3,20-dione
6,21-difluoro-Δ⁴,⁶-19-nor-9β,10α-pregnadiene-17α-ol-3,20-dione
21-fluoro-6,16α-dimethyl-Δ⁴,⁶-19-nor-9β,10α-pregnadiene-17α-ol-3,20-dione
21-chloro-Δ⁴,⁶-19-nor-9β,10α-pregnadiene-17α-ol-3,20-dione
21-chloro-16α,17α-isopropylidenedioxy-Δ⁴,⁶-19-nor-9β,10α-pregnadiene-3,20-dione
6,21-dichloro-Δ⁴,⁶-19-nor-9β,10α-pregnadiene-17α-ol-3,20-dione
6-fluoro-21-chloro-16α-methyl-Δ⁴,⁶-19-nor-9β,10α-pregnadiene-17α-ol-3,20-dione

We claim:
1. A compound of the following formula:

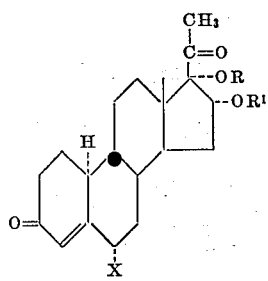

wherein R and R¹ are selected from the group consisting of hydrogen and a hydrocarbon carboxylic acyl group of less than 12 carbon atoms and X is selected from the group consisting of hydrogen and methyl.

2. Δ⁴-19-nor-9β,10α-pregnene-16α,17α-diol-3,20-dione.

3. 6α - methyl-Δ⁴-19-nor-9β,10α-pregnene-16α,17α-diol-3,20-dione.

4. A compound of the following formula:

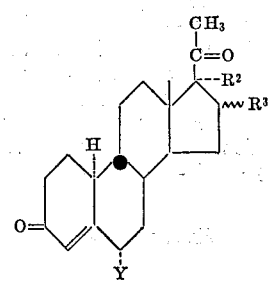

wherein R² is selected from the group consisting of hydrogen, α-hydroxy and α-hydrocarbon carboxylic acyloxy of less than 12 carbon atoms; R³ is selected from the group consisting of hydrogen, α-methyl, β-methyl, α-hydroxy and α-hydrocarbon carboxylic acyloxy of less than 12 carbon atoms; R² and R³ together represent the group

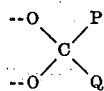

wherein P represents a lower alkyl group of up to 8 carbon atoms and Q is selected from the group consisting of hydrogen, an alkyl group, an aryl group and an aralkyl group, each containing up to 8 carbon atoms; and Y is selected from the group consisting of chlorine and fluorine.

5. 6α - chloro-Δ⁴-19-nor-9β,10α-pregnen-17α-ol - 3,20-dione.

6. 6α-chloro-16α-methyl-Δ⁴-19-nor - 9β,10α - pregnen-17α-ol-3,20-dione.

7. 6α - chloro-16α,17α-isopropylidenedioxy-Δ⁴-19-nor-9β,10α-pregnene-3,20-dione.

8. 6α-fluoro-Δ⁴-19-nor-9β,10α,pregnen-17α - ol - 3,20-dione.

9. 6α-fluoro - 16α - methyl-Δ⁴-19-nor-9β,10α-pregnen-17-ol-3,20-dione.

10. 6 - fluoro - 16α,17α-isopropylidenedioxy-Δ⁴-19-nor-9β,10α-pregnene-3,20-dione.

11. A compound of the following formula:

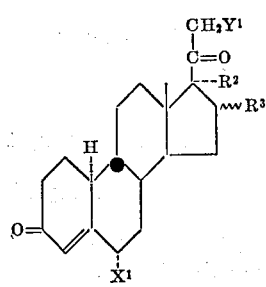

wherein R² is selected from the group consisting of hydrogen, α-hydroxy and α-hydrocarbon carboxylic acyloxy of less than 12 carbon atoms; R³ is selected from the group consisting of hydrogen, α-methyl, β-methyl, α-hydroxy and α-hydrocarbon carboxylic acyloxy of less than 12 carbon atoms; R² and R³ together represent the group

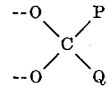

wherein P represents a lower alkyl group of up to 8 carbon atoms and Q is selected from the group consisting of hydrogen, an alkyl group, an aryl group and an aralkyl group, each containing up to 8 carbon atoms; X¹ is selected from the group consisting of hydrogen, methyl, fluorine and chlorine, with at least one of R³ and X¹ being other than hydrogen when R² is other than hydrogen, and Y¹ is selected from the group consisting of fluorine and chlorine.

12. 21 - fluoro-6α,16α-dimethyl-Δ⁴-19-nor-9β-10α-pregnen-17α-ol-3,20-dione.

13. A compound of the following formula:

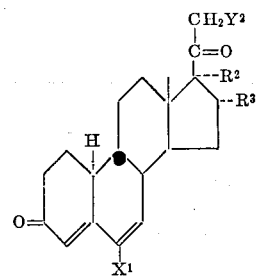

wherein P represents a lower alkyl group of up to 8 cardrogen, α-hydroxy and α-hydrocarbon carboxylic acyloxy of less than 12 carbon atoms; R³ is selected from the group, each containing up to 8 carbon atoms; X¹ is sedroxy and α-hydrocarbon carboxylic acyloxy of less than 12 carbon atoms; R² and R³ together represent the group

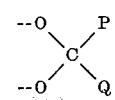

wherein P represents a lower alkyl group of up to 18 carbon atoms and Q is selected from the group consisting of hydrogen, an alkyl group, an aryl group and an aralkyl group, each containing up to 8 carbon atoms; X¹ is selected from the group consisting of hydrogen, methyl, chlorine, with at least one R³ and X¹ being other than hydrogen when R² is other than hydrogen, and fluorine and Y² is selected from the group consisting of hydrogen, chlorine and fluorine.

14. 6-methyl - Δ⁴,⁶-19-nor-9β,10α-pregnadien-17α-ol-3,20-dione.

15. 16α,17α-isopropylidenedioxy - Δ⁴,⁶ - 19-nor-9β,10α-pregnadiene-3,20-dione.

16. A compound of the following formula:

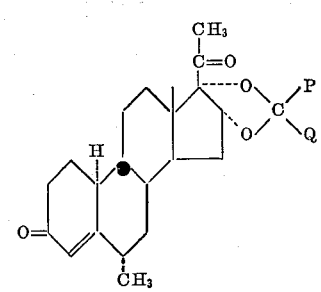

wherein P represents a lower alkyl group of up to 8 carbon atoms and Q is selected from the group consisting of hydrogen, an alkyl group, an aryl group and an aralkyl group, each containing up to 8 carbon atoms.

17. 6α-methyl - 16α,17α - isopropylidenedioxy-Δ⁴-19-nor-9β,10α-pregnene-3,20-dione.

18. 6α-methyl - 21 - fluoro-Δ⁴-19-nor-9β,10α-pregnen-17α-ol-3,20-dione.

19. 16α,17α - isopropylidenedioxy - 21 - fluoro-Δ⁴-19-nor-9β,10α-pregnene-3,20-dione.

20. 6-chloro - 16α,17α - isopropylidenedioxy-Δ⁴,⁶-19-nor-9β,10α-pregnadiene-3,20-dione.

References Cited by the Examiner
UNITED STATES PATENTS

| 3,009,929 | 11/61 | Reimann et al. | 260—397.3 |
| 3,098,860 | 7/63 | Hoffman | 260—397.4 |
| 3,099,656 | 7/63 | Zderic et al. | 260—239.55 |

OTHER REFERENCES

Westerhof: "Rex. Trav. Chim," vol. 79 (1960).

LEWIS GOTTS, *Primary Examiner.*

UNITED STATES PATENT OFFICE
CERTIFICATE OF CORRECTION

Patent No. 3,213,087                  October 19, 1965

Albert Bowers et al.

It is hereby certified that error appears in the above numbered patent requiring correction and that the said Letters Patent should read as corrected below.

Column 2, line 29, for "acid" read -- acyl --; column 3, lines 1 to 15, for that portion of formula III reading "Y" read -- X --; column 5, lines 1 to 15, formula XIV should appear as shown below instead of as in the patent:

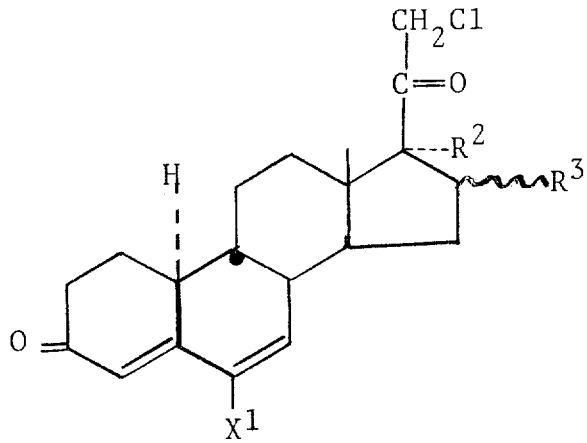

column 5, line 41, after "19" insert -- -nor --; column 10, line 59, after "Δ$^{4,6}$" insert -- -19 --; line 21, for "-done" read -- -dione --; column 11, line 61, for "6" read -- 6α --; column 12, line 36, beginning with "P represents" strike out all to and including "droxy" in line 40, and insert instead -- R$^2$ is selected from the group consisting of hydrogen, α-hydroxy and α-hydrocarbon carboxylic acyloxy of less than 12 carbon atoms; R$^3$ is selected from the group consisting of hydrogen, α-methyl, β-methyl, α-hydroxy --; line 47, for "18" read -- 8 --; same column 12, line 52, after "one" insert -- of --.

Signed and sealed this 3rd day of September 1968.

(SEAL)
Attest:

EDWARD M. FLETCHER, JR.             EDWARD J. BRENNER
Attesting Officer                 Commissioner of Patents